United States Patent [19]

Kimber et al.

[11] Patent Number: 4,914,674
[45] Date of Patent: Apr. 3, 1990

[54] SIGNAL GENERATOR

[75] Inventors: Ian D. Kimber, Bracknell; Nicholas A. Young, Worcester, both of England

[73] Assignee: EMI Limited, Hayes, United Kingdom

[21] Appl. No.: 838,787

[22] Filed: Mar. 12, 1986

[30] Foreign Application Priority Data

Mar. 15, 1985 [GB] United Kingdom ............... 8506811

[51] Int. Cl.$^4$ ..................... H04B 15/00; H04K 1/00
[52] U.S. Cl. ......................................... 375/1; 370/50; 331/78
[58] Field of Search ............... 375/1, 25, 26, 115; 370/70, 120, 50, 20; 328/151; 331/78; 364/517

[56] References Cited

U.S. PATENT DOCUMENTS

| | | | |
|---|---|---|---|
| 3,175,212 | 3/1965 | Miller | 375/26 |
| 3,343,087 | 9/1967 | Helms | 375/26 |
| 3,500,247 | 3/1970 | Sekimoto et al. | 375/26 |
| 3,676,598 | 11/1972 | Kurth | 370/70 |
| 3,772,681 | 11/1973 | Skingle | 328/14 |
| 3,777,277 | 12/1973 | Naber | 331/49 |
| 3,780,213 | 12/1973 | Harna | 331/78 |
| 4,355,399 | 10/1982 | Timor | 375/62 |
| 4,385,381 | 5/1983 | Alexis | 370/70 |
| 4,430,736 | 2/1984 | Scholz | 328/151 |
| 4,589,018 | 5/1986 | Haskell et al. | 370/50 |
| 4,606,041 | 8/1986 | Kadin | 375/115 |

*Primary Examiner*—Benedict V. Safourek
*Assistant Examiner*—Stephen Chin
*Attorney, Agent, or Firm*—Fleit, Jacobson, Cohn, Price, Holman & Stern

[57] ABSTRACT

A signal generator produces a spread-spectrum bandwidth signal in the frequency range 40 to 90 KHz for use in a domestic mains signalling system. In the generator, sixteen individual frequencies, equi-spaced in that range, pass to samplers operating at a clock frequency of 204.8 KHz and then to quantizers before storage. The resultant signals are then assembled in appropriate manner by selector switch before being filtered when (temporarily) in the frequency domain.

The resultant signals duly reach catalogue store, whose output can be used for programming an EPROM in a mains signalling interface unit.

12 Claims, 2 Drawing Sheets

SIGNAL GENERATOR

FIELD OF THE INVENTION

The present invention relates to a limited-bandwidth signal generator especially, but not solely for use in a transmission system, and to a method of producing a limited-bandwidth signal.

DESCRIPTION OF RELATED ART

A typical domestic mains signalling system utilizes spread-spectrum signalling over a range between 20 and 200 KHz. Each electrical appliance, which is controllable by the mainsborne system, has an interface unit capable of producing spread-spectrum signals over a broad bandwith for subsequent filtering in order to fit into the required range of 20 to 200 KHz.

The Association of Control Manufacturers has recommended that the bandwidth of a mains signalling system should be limited to the range of 40 to 90 KHz and the noise generated outside this range to be severely restricted. The signals produced by the existing interface units do not meet these new requirements. Moreover, even if multi-stage analogue filters (which would have to be large and expensive) were used in conjunction with the existing interface units, the resultant signals would still be inadequate for satisfying the proposed regulations; use of such analogue filters may also cause some phase shift in the pass band.

OBJECT OF THE INVENTION

An object of the present invention is to enable the production of spread-spectrum signals over a specified frequency range.

SUMMARY OF THE INVENTION

The present invention provides a signal generator for producing a spread-spectrum bandwidth signal ranged between specified frequencies, the generator having:

means to produce a number of single-frequency signal waveforms, each having a distinctive frequency within the range of specified frequencies;

means to sample each of the single-frequency signal waveforms at a sampling rate exceeding the frequency of that waveform;

means to quantise, between two or more levels, the sampling values of each waveform; and means to combine together the quantised sampling values for a plurality of the waveforms in a predetermined fashion.

In one form of the invention, the combination means assembles the quantised sampling values attributed to the waveforms in order of ascending frequency of waveform. Alternatively, the values could be assembled in descending frequency of waveform, or in random manner independent of frequency, or in any suitable combination of these modes.

Preferably, the generator includes means to ensure phase continuity between quantised sampling values of separate waveforms upon joining at the combination means. This may incorporate, for example, storage means for holding sequences of values for the waveforms (or sequences of waveform portions themselves), whereby all the sequences have a common starting-point in phase; thus, by ensuring that, in the combination operation, all the sequences terminate at that same phase position, then phase-continuity will be achieved.

Preferably, the waveform-production means has a frequency distribution arranged to exclude waveforms at or closely adjacent one or more frequencies associated with common forms of interference. By "closely adjacent", there is meant that all the waveforms from the production means are sufficiently spaced from the frequency or frequencies associated with interference such that there is substantially no combination (or overlap) of waveforms at the interference frequency or frequencies. In this way, the effect of any such interference signals on the generated spectrum is minimised. One such potential source of interference whose effect is preferably avoided is the television line timebase signal which has a fundamental frequency of 15.625 KHz.

Preferably the waveform-production means has a frequency distribution arranged such that, in the resultant spectrum, one waveform has a first lower sideband lying over the main lobe of the adjacent waveforms. In this way, the distance from one band to the next is considerably increased, thereby removing the sidelobes produced in the frequency domain being reflections of the main lobe about each harmonic of the clock frequency. To achieve this arrangement of sidebands and lobes, the clock frequency must be substantially double the centre frequency of the specified range.

Preferably the combination means incorporates a sample-and-hold device to achieve appropriate assembly of the waveforms.

In one application of the present invention, the output of the signal generator is used in the programming of a solid-state device incorporating data storage, whereby the device is suited for use as a signal source in an appliance unit of a mains signalling system.

According to another aspect, the present invention also provides a method of producing a spread-spectrum bandwidth signal ranged between specified frequencies, the method including:

producing a number of single-frequency signal waveforms, each having a distinctive frequency within the range of specified frequencies;

sampling each of the single-frequency waveforms at a sampling rate exceeding the frequency of that waveform;

quantising, between two or more levels, the sampling values of each waveform; and combining together the quantised sampling values for a plurality of the waveforms in a predetermined fashion.

Preferably the step of combining together the values of the respective waveforms includes assembling the values of the waveforms in order of ascending frequency of waveform. Alternatively the assembly is in order of descending frequency, or in random manner independent of frequency, or in any suitable combination of these modes.

Preferably the method includes providing phase-continuity between quantised sampling values of separate waveforms at the combination step.

Preferably the method includes producing a number of single-frequency signal waveforms which exclude those at or closely adjacent any frequencies associated with common forms of interference.

BRIEF DESCRIPTION OF THE DRAWINGS

In order that the invention may more readily be understood, a description is now given, by way of example only, reference being made to the accompanying drawings in which.

DESCRIPTION OF THE PREFERRED EMBODIMENT

Figure 1:
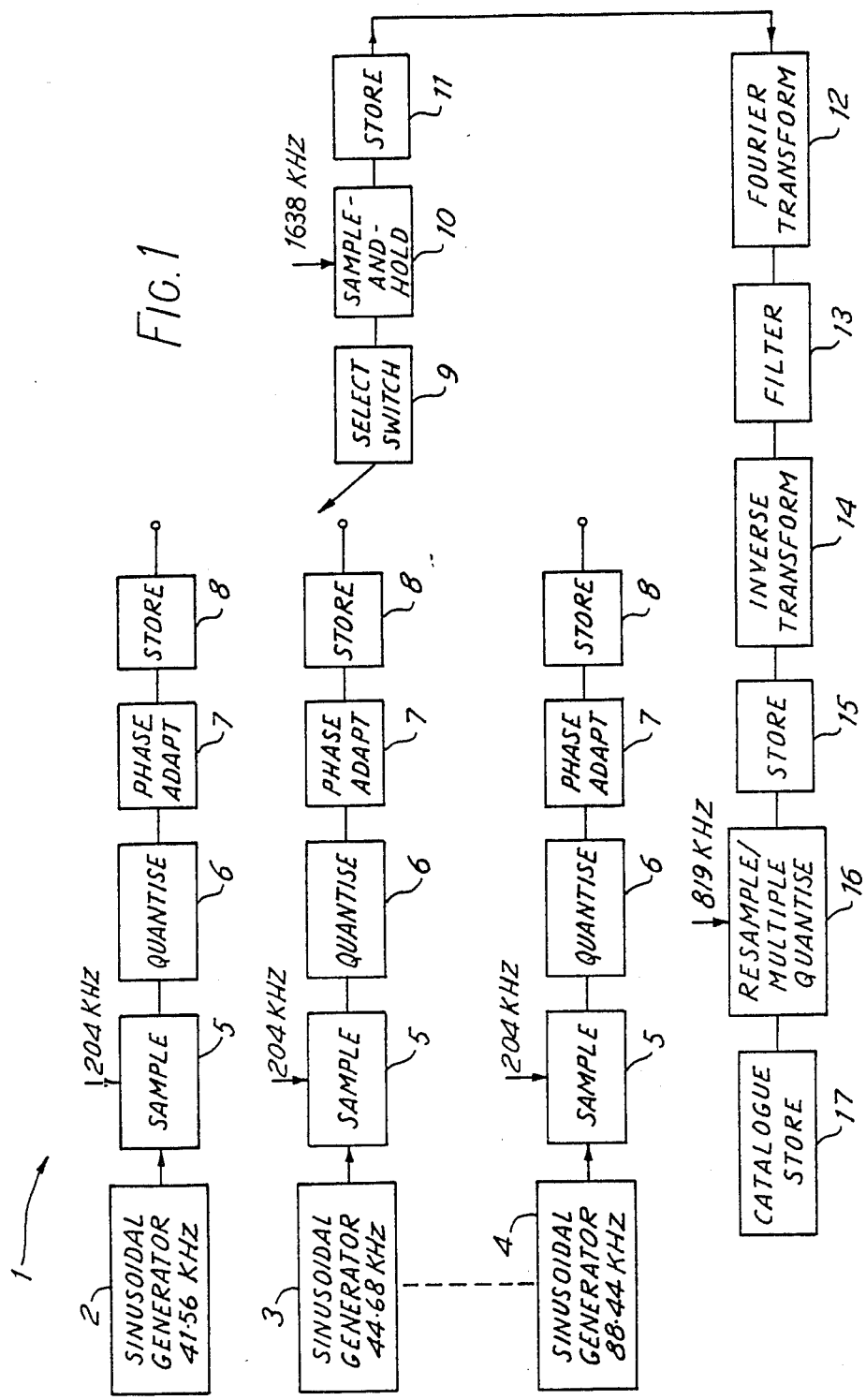
FIG. 1 shows schematically a signal generator embodying the present invention.

The illustrated signal generator described hereafter is designed to produce a spread-spectrum bandwidth signal substantially contained within the frequency range 40 to 90 KHz. Signals derived from this generator are to be used in a domestic mains signalling system; a signal is formed of data "1" and data "0" bits, each bit comprising a sequence of 1024 components (hereafter called chips) which can take only the values 0 and 1, so that accordingly a sequence has a rectangular waveform. The data rate is 200 Hz and the chip clock frequency is 204.8 KHz.

The spread-spectrum generator (preferenced generally as 1) has sixteen individual sinusoidal generators (only 2, 3 and 4 being shown) whose respective frequencies are equi-spaced across the spread-spectrum range; thus generator 2 has an output frequency of 41.45 KHz, generator 3 one of 44.68 KHz, and generator 4 one of 88.44 KHz. Taking first generator 2, the signal output therefrom passes to a sampler 5 which operates at a clock frequency of 204.8 KHz to derive 64 samples which then proceed to a quantiser 6 which quantises them to one amplitude level (i.e. "0" or "1"). The resultant string of chips then pass through a phase sorter 7 (whose operation will be described below) and are subsequently held in store 8.

The signals output from the other fifteen sinusoidal generators are likewise processed into strings of chips which are accordingly held in store. Then a selector switch 9 is operated in order to output the strings of chips from stores 8 in a predetermined order: for example the strings may be output in an ascending-frequency order (i.e. starting with the string from generator 2, continuing with that from generator 3 and ending with that from generator 4) or in a descending-frequency order (i.e. starting with the string from generator 4 and ending with that from generator 2), or in a random order without relation to the frequency. The strings of chips are combined in a sample-and-hold circuit 10 and then stored therein. Once the switch 9 has received a string of chips from each store 8, there are a total of 1024 chips at the sample-and-hold circuit 10, sufficient for a complete data bit.

The phase sorters 7 ensure that the assembly of the separate strings occurs with substantially no phase discontinuities at the interfaces between strings.

The sample-and-hold circuit 10 is clocked at 1638 KHz to output the assembled strings of chips to a store 11 in preparation for digital filtering. In this digital filtering operation, the data is passed through a fast Fourier Transform converter 12 to convert it from the time domain to the frequency domain, then a sharp digital filter 13 is used to remove any frequencies in the data outside the specified range. The resultant signal is then converted back to the time domain by an inverse transform converter 14 for subsequent storage in store 15. The data is then passed to a resampler and quantiser circuit 16, which resamples the data at a clock frequency of 819 KHz in order to ensure that the side lobes of the data are sufficiently separated from the main portion to enable them to be removed by a simple analogue filter. Circuit 16 also quantises the data to a number of additional levels (for example, with six bits to 64 levels), so that the chip strings no longer consist of just chips but rather form 6-bit words. Once the signal has completed the processing of circuit 16, it is passed on to catalogue store 17.

The procedure described above in relation to FIG. 1 can be modified by quantiser 6 quantising the 64 samples to more than one amplitude level, and/or by providing a much higher clock frequency, for example 1368 KHz.

Thus the signal which reaches catalogue store 17 is a spread-spectrum signal substantially restricted to the frequency range of 40 to 90 KHz and formed of a particular arrangement of six-bit words, each representing a data bit (either "0" or "1") for one communication channel produced by ascending-frequency selection.

Figure 2:
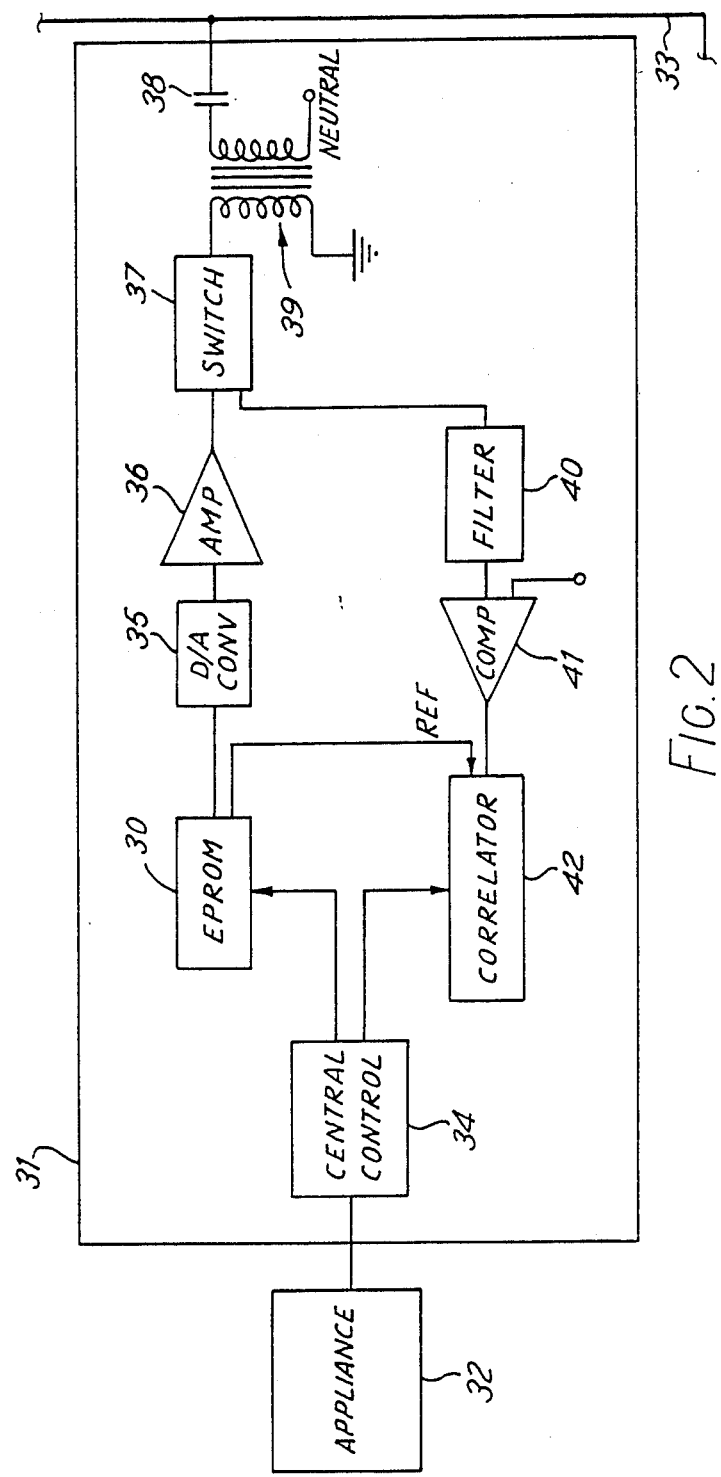
FIG. 2 shows part of a mains signalling transmission system which utilizes the present invention.

Thus, in due course the catalogue store 17 holds a record of all the data bits for the channels, so that the output from this store 17 can be used to programme an EPROM 30 in a interface unit 31 which is connected between a domestic electrical appliance 32 and the electrical mains circuit 33 of the dwelling (see FIG. 2). In this way, the EPROM 30 acts as a source of a sufficient number of spread-spectrum signals for a communication channel for use in mains signalling.

The interface unit 31 has a central control 34 which regulates all the necessary operations, for example the transmission of any signals (e.g. relating to the appliance-status or instruction-completion) into the mains signalling system or the reception of any signals (e.g. relating to status-interrogation or instruction-issuing) from the system.

In order to transmit a message to the system, unit central control 34 instructs EPROM 30 so as to output the appropriate series of data bits of one communication channel, these then passing through a digital-to-analogue converter 35 to a power amplifier 36. The resultant message is coupled onto the mains circuit 33 via a switch 37, a capacitor 38 and transformer 39.

Except when message-transmission occurs, switch 37 is set to the position allowing signals on the mains circuit 33 to enter interface unit 31 via transformer 39 and pass to a mains interference filter 40. Any signals which emerge from filter 40 pass to a comparator 4, which hard-clips the signal to transform it into binary data which proceeds to a correlator 42 which analyses any signals it receives with reference signals for the communication channels provided by EPROM 30 in order to establish any correspondence or similarity enabling decoding of the received signal.

When interface unit 31 is in a search mode (i.e. when it is not receiving recognisable data nor transmitting any data), the correlator 42 is continually searching for that position of the reference sequence, either data "0" or data "1", which gives the highest correlation value against the incoming signal. It compiles a "search table" of the ten best positions and then ]tries them in turn to see if any pass the tracking tests.

If it is desired to produce an EPROM 30 capable of providing signals for a number of separate communication channels, then the spread-spectrum generation procedure is repeated again but with the selection by switch 9 being in another mode (e.g. descending frequency or random selection) in order to produce a different arrangement of chip strings for use as a data bit for another communication channel in the system.

In one modification to signal generator 1, the frequency output of one or more of the sixteen sinusoidal generators is or are adjusted in order to avoid fundamental or harmonic frequencies associated with commonly-known interference signals (e.g. the television line timebase of 15.625 KHz).

In another form of signal generator embodying the present invention, the sixteen individual sinusoidal generators are replaced by a single voltage-controlled oscillator whose control voltage is derived from a microprocessor via a digital-to-analogue converter or from a ramp generator or from a staircase generator.

In a modification to any of the forms of signal generator described above, at least some of the quantising, phasing and filtering steps are achieved by one or more appropriately programmed microprocessors.

We claim:

1. A spread spectrum signal generator for producing a spread-spectrum bandwidth signal ranged between specified frequencies, the generator characterised by:
   means to produce a number of single-frequency signal waveforms, each having a distinctive frequency within the range of specified frequencies with frequencies at or closely adjacent one or more frequencies associated with common forms of interference being excluded;
   means to sample each of the single-frequency signal waveforms at a sampling rate exceeding the frequency of that waveform;
   means to quantise, between two or more levels, the sampling values of each waveform; and
   means to combine together the quantised sampling values for a plurality of the waveforms in a predetermined fashion.

2. A signal generator according to claim 1, characterised by means to ensure phase continuity between quantised sampling values of separate waveforms upon joining at the combination means.

3. A signal generator according to claim 1 characterized by the combination means incorporating a sample-and-hold device to achieve appropriate assembly of the waveform.

4. A signal generator according to claim 1 characterised by the distinctive frequencies produced by said means to produce a number of single-frequency waveforms having a frequency distribution arranged such that, in the resultant spectrum produced by the means to combine, one waveform has a first lower sideband lying over the main lobe of the adjacent waveforms.

5. An appliance unit for a mains signalling system, the unit characterised by a signal source comprising a solid-state storage device with spread-spectrum signals derived from a signal generator, the generator having:
   means to produce a number of single-frequency signal wave forms, each having a distinctive frequency within the range of specified frequencies with frequencies at or closely adjacent one or more frequencies associated with common forms of interference being excluded;
   means to sample each of the single-frequency signal waveforms at a sampling rate exceeding the frequency of that waveform;
   means to quantise, between two or more levels, the sampling values of each waveform; and
   means to combine together the quantised sampling values for a plurality of the waveforms in a predetermined fashion.

6. A method of producing a spread-spectrum bandwidth signal range between specified frequencies, the method including:
   producing a number of single-frequency signal waveforms, each having a distinctive frequency within the range of specified frequencies with frequencies at or closely adjacent one or more frequencies associated with common forms of interference being excluded;
   sampling each of the single-frequency waveforms at a sampling rate exceeding the frequency of that waveform;
   quantising, between two or more levels, the sampling values of each waveform; and
   combining together the quantised sampling values for a plurality of the waveforms in a predetermined fashion.

7. A method according to claim 6, characterised by providing phase-continuity between quantised sampling values of separate waveforms at the combination step.

8. A method according to claim 6, wherein the step of combining together the values of the respective waveforms includes assembling the values of the respective waveforms in order of ascending frequency of waveform.

9. A spread spectrum signal generator for producing a spread-spectrum bandwidth signal ranged between specified frequencies, the generator characterised by:
   means to produce a number of single-frequency signal waveforms, each having a distinctive frequency within the range of specified frequencies;
   means to sample each of the single-frequency signal waveforms at a sampling rate exceeding the frequency of that waveform;
   means to quantise, between two or more levels, the sampling values of each waveform; and
   means to combine together the quantised sampling values for a plurality of the waveforms in a predetermined fashion said distinctive frequencies produced by said means to produce a number of single-frequency signal waveforms being such that in the signal produced by the means to combine one waveform has a first lower sideband lying over the main lobe of the adjacent waveforms.

10. A signal generator according to claim 9, characterised by means to ensure phase continuity between quantised sampling values of separate waveforms upon joining at the combination means.

11. A signal generator according to claim 9, characterised by the distinctive frequencies produced by said means to produce a number of single-frequency waveforms having a frequency distribution arranged to exclude waveforms at or closely adjacent one or more frequencies associated with common forms of interference.

12. A signal generator according to claim 9 characterised by the combination means incorporating a sample-and-hold device to achieve appropriate assembly of the waveforms.

* * * * *